United States Patent
Hartman et al.

(10) Patent No.: US 6,574,310 B1
(45) Date of Patent: Jun. 3, 2003

(54) APPARATUS AND METHOD FOR A WIDE BAND SPECTRAL BALANCE MEASUREMENT

(75) Inventors: Larry Hartman, Potomac, MD (US); Paul Wyar, Mt. Airy, MD (US); Greg Quiggle, Columbia, MD (US)

(73) Assignee: Acterna, LLC, Germantown, MD (US)

( * ) Notice: Subject to any disclaimer, the term of this patent is extended or adjusted under 35 U.S.C. 154(b) by 0 days.

(21) Appl. No.: 09/559,194

(22) Filed: Apr. 27, 2000

(51) Int. Cl.[7] .......................... H04M 1/24; H04M 3/08; H04M 3/22
(52) U.S. Cl. .................. 379/21; 379/22.02; 379/22.07; 379/24; 379/27.03; 379/27.05; 379/30
(58) Field of Search ............................. 379/5, 6, 7, 22, 379/29, 30–32, 34, 21, 22.02, 22.07, 24, 27.03, 29.05

(56) References Cited

U.S. PATENT DOCUMENTS

| | | | |
|---|---|---|---|
| 4,868,506 A | * 9/1989 | DiStefano et al. | 379/26 |
| 5,404,388 A | * 4/1995 | Eu | 379/24 |
| 5,436,953 A | * 7/1995 | Nilson | 379/27.01 |
| 5,465,287 A | * 11/1995 | Egozi | 379/5 |
| 5,956,386 A | * 9/1999 | Miller | 379/27 |
| 6,144,721 A | * 11/2000 | Stephens | 379/21 |
| 6,169,785 B1 | * 1/2001 | Okazaki | 379/27 |
| 6,215,855 B1 | * 4/2001 | Schneider | 379/22 |
| 6,385,297 B2 | * 5/2002 | Faulkner et al. | 379/27.01 |

FOREIGN PATENT DOCUMENTS

EP WO 00/27134 * 5/2000

OTHER PUBLICATIONS

IEEE Standard Test Procedure for Measuring Longitudinal Balance of Telephone Equipment Operating In the Voice Band, Jul. 25, 1985, pp. 1–22.
"IEEE Std 743–1995 IEEE Standard Equipment Requirements and Measurement Techniques for Analog Transmission Parameters for Telecommunications" IEEE Standard 743–1995, XX, XX, 1996, XP 0021148950.

* cited by examiner

*Primary Examiner*—Binh Tieu
(74) *Attorney, Agent, or Firm*—Reed Smith LLP (57) ABSTRACT

A method and apparatus for testing telephone equipment for longitudinal balance. A signal generating circuit places a test signal at a certain frequency on the tip and ring wires of a telephone line. The telephone line is monitored and the signals on the tip and ring wires are measured and compared against each other. The frequency is gradually increased in set increments until the test frequency is in the megahertz range.

16 Claims, 5 Drawing Sheets

| Frequency | Test 1 | Test 2 | Test 3 |
|---|---|---|---|
| 10 | -42.5 | -50.5 | -52.5 |
| 80 | -42.8 | -49.9 | -53.0 |
| 150 | -42.6 | -49.2 | -53.8 |
| 220 | -41.6 | -47.4 | -55.5 |
| 290 | -40.5 | -45.1 | -57.8 |
| 360 | -40.8 | -42.9 | -61.4 |
| 430 | -44.4 | -41.0 | -67.9 |
| 500 | -34.1 | -39.3 | -60.1 |
| 570 | -28.6 | -37.8 | -56.9 |
| 640 | -23.6 | -36.5 | -53.8 |
| 710 | -17.1 | -35.3 | -49.2 |
| 780 | -14.0 | -34.2 | -47.7 |
| 850 | -17.1 | -33.2 | -52.2 |
| 920 | -17.7 | -32.3 | -54.2 |
| 990 | -17.8 | -31.5 | -55.6 |

APPARATUS AND METHOD FOR A WIDE BAND SPECTRAL BALANCE MEASUREMENT

BACKGROUND

A) Field of Invention

The present invention relates to communications testing equipment and more particularly to communication testing equipment which tests the longitudinal balance of telephone equipment.

B) Background of Invention

A telephone line generally contains three separate wires. Two of these wires are referred to as the tip and ring wires and the third wire is usually a grounded wire. The actual signal used in telecommunications is carried on the tip and ring wires with the grounded wire being used as a reference.

In the telephone line, the tip and ring wires are continually twisted around one another. Since the telephone line can extend great distances, it can be subject to many disturbances that can cause interference with the electrical signals carried along those lines. By twisting the two wires around each other, it increases the probability of having any disturbances affect both wires equally. This equal distribution of the interference among the two wires reduces the problems caused by any disturbance.

Twisting the tip and ring wires around each other is one attempt of ensuring that the two wires are electrically balanced. An imbalance between the wires increases the susceptibility of noise pick-up that can disrupt the transmission of the signals. Accordingly, it is important to be able to test the wires to determine whether they are equally affected by any disturbances in the wire or whether the wires are imbalanced. In testing the wires, it is important that the test equipment itself does not contribute to the imbalance measurement.

In the prior art, a telephone line is tested for an imbalance by applying a 1 kHz pulse test signal to both the tip and ring wires. By exciting both the tip and ring wires with the same voltage at the same frequency, the line can be monitored to determine whether an imbalance occurs. If the signal on one wire is different from the signal on the other wire, then an imbalance between the wires exists. This prior art is primarily applicable for voice band application.

In applying a 1 kHz test signal, the balance test will return a single measurement representing the balance level between the two wires. If this measurement is below a predetermined level, then the line can be considered to be electrically balanced. The level is empirically determined and approximates the acceptable tolerances of the telephone line.

This test, however, does not adequately predict the vulnerability of the line to be potentially disturbed by noise disruptions. By using only one measurement and comparing it against an empirically set standard, it gives an inaccurate depiction of the balance of the telephone line because it oversimplifies the range of different types of disturbances that can affect the line. For example, disturbances at higher frequencies will not be measured by this 1 kHz test. In addition, this inaccuracy does not address the situation when a disturbance is intermittent and the magnitude of the disturbance varies throughout the day above the audio range.

A typical voice transmission in a telephone line can have frequencies which range up to 4 kHz. Advances in telecommunications have created the need for transmissions at higher frequencies. For example, an XDSL line can operate in the megahertz range. The conventional method of using a 1 kHz pulse to test for imbalances cannot detect when a disturbance in a line is occurring at such high frequencies. In particular, radio waves which operate at those higher frequency ranges can disturb the high frequency signals sent on the telephone line. In addition, the reach and nature of radio waves can vary during the day which makes radio wave interference to be intermittent.

Therefore, there currently exists a need for a balance test to be able to detect imbalances at high frequencies. There also exists a need for a balance test that reports results that more accurately indicate the telephone line's vulnerability to disturbances due to imbalances in the line.

SUMMARY OF THE INVENTION

The current invention involves a wide band spectral balance test. The test initiates a signal on the tip and ring wires of a telephone line that starts with a low frequency tone and increases the frequency in predetermined intervals up to the higher frequency ranges. The line is monitored for the signals carried on both the tip and ring. The signals on both the tip and ring wires are measured and compared. Measurements and comparisons of those measurements are taken at each frequency level. The results are then plotted on a graph indicating the decibels versus frequency.

In accordance with one embodiment of the invention, a wide band spectral tester comprises a signal generator to create a signal at a set frequency and to cause the created signal to be placed on a first wire and a second wire in a telephone line; and a signal receiver to monitor the first and second wires and compare the signals on the first wire against the signals on the second wire to determine whether the first wire and the second wire are balanced; wherein, the signal placed on the first wire is identical to the signal placed on the second wire and the signal placed on the first and second wires includes signals above 1 kHz.

In accordance with another aspect of this embodiment of the invention, the longitudinal balance tester includes a digital signal processor and a digital to analog converter.

In accordance with another aspect of this embodiment of the invention, the longitudinal balance tester includes a numerically controlled oscillator.

In accordance with another aspect of this embodiment of the invention, the longitudinal balance tester includes a digital signal processor, a differential amplifier and an analog to digital converter.

In accordance with another aspect of this embodiment of the invention, the signal generator places the created signal on a grounded wire in the telephone line.

In accordance with another aspect of this embodiment of the invention, the signal receiver includes balanced test wires to connect to the first and second wires in the telephone line.

In accordance with another aspect of this embodiment of the invention, the first and second wires constitute a twisted pair of wires in the telephone line.

In accordance with another aspect of this embodiment of the invention, the created signal includes frequencies above 10 kilohertz.

In accordance with another aspect of this embodiment of the invention, the created signal includes frequencies above 50 kilohertz.

In accordance with another aspect of this embodiment of the invention, the created signal includes frequencies above 100 kilohertz.

In accordance with another aspect of this embodiment of the invention, the created signal include frequencies above 1 megahertz.

In accordance with yet another embodiment of the invention, a method for testing a telephone line for longitudinal balance is disclosed which comprises the steps of creating a signal at a set frequency; the signal including frequencies in the megahertz range; placing the signal on a first and second wire in a telephone line; monitoring and detecting signals on the first and second wires; and measuring any differences between signals on the first and second wires.

In accordance with another aspect of this embodiment of the invention, the signal includes frequencies above 10 kHz.

In accordance with another aspect of this embodiment of the invention, the signal includes frequencies above 50 kHz.

In accordance with another aspect of this embodiment of the invention, the signal includes frequencies above 100 kilohertz.

In accordance with another aspect of this embodiment of the invention, the signal includes frequencies above 1 megahertz.

In accordance with still another embodiment of the invention, a method for testing a telephone line for longitudinal balance is disclosed that comprises the steps of setting an initial frequency; generating a signal at a frequency; causing the generated signal to be placed on a first and second wires in a telephone line; monitoring signals on the first and second wires; measuring any differences between signals on the first wire and signals on the second wire; recording each measurement of differences for the frequency; increasing the frequency level by a predetermined amount; and repeating the generating, causing, monitoring, measuring, recording and increasing steps until the frequency level reaches a predetermined final frequency level.

In accordance with another aspect of this embodiment of the invention, the method further comprises step of displaying the difference measurements against the frequency in graphical form.

In accordance with another aspect of this embodiment of the invention, the predetermined final frequency level is greater than the initial frequency level by 10 kilohertz.

In accordance with another aspect of this embodiment of the invention, the predetermined final frequency level is greater than the initial frequency level by 100 kHz In accordance with another aspect of this embodiment of the invention, the predetermined final frequency level is greater than the initial frequency level by 1 MHz.

In accordance with another aspect of this embodiment of the invention, the predetermined final frequency level is greater than 10 kHz.

In accordance with another aspect of this embodiment of the invention, the predetermined final frequency level is greater than 100 kHz.

In accordance with another aspect of this embodiment of the invention, the predetermined final frequency level is greater than 1 mHz.

In accordance with still another embodiment of the invention, a method for testing a telephone line for longitudinal balance is disclosed that comprises the steps of setting a frequency range to be tested; generating a test signal; said signal including a plurality of frequencies; causing said generated signal to be placed on first and second wires in a telephone line; monitoring signals on said first and second wires; measuring any differences between signals on said first wire and signals on said second wire; recording each measurement of difference for each said frequency that was included in said signal; changing the frequencies that are included in said signal; repeating said generating, causing, monitoring, measuring, recording and changing steps until each frequency in said frequency range has been included in said test signal.

BRIEF DESCRIPTION OF THE DRAWINGS

The accompanying drawings are included to provide an understanding of the invention and constitute a part of the specification.

DESCRIPTION OF THE INVENTION

Figure 1:
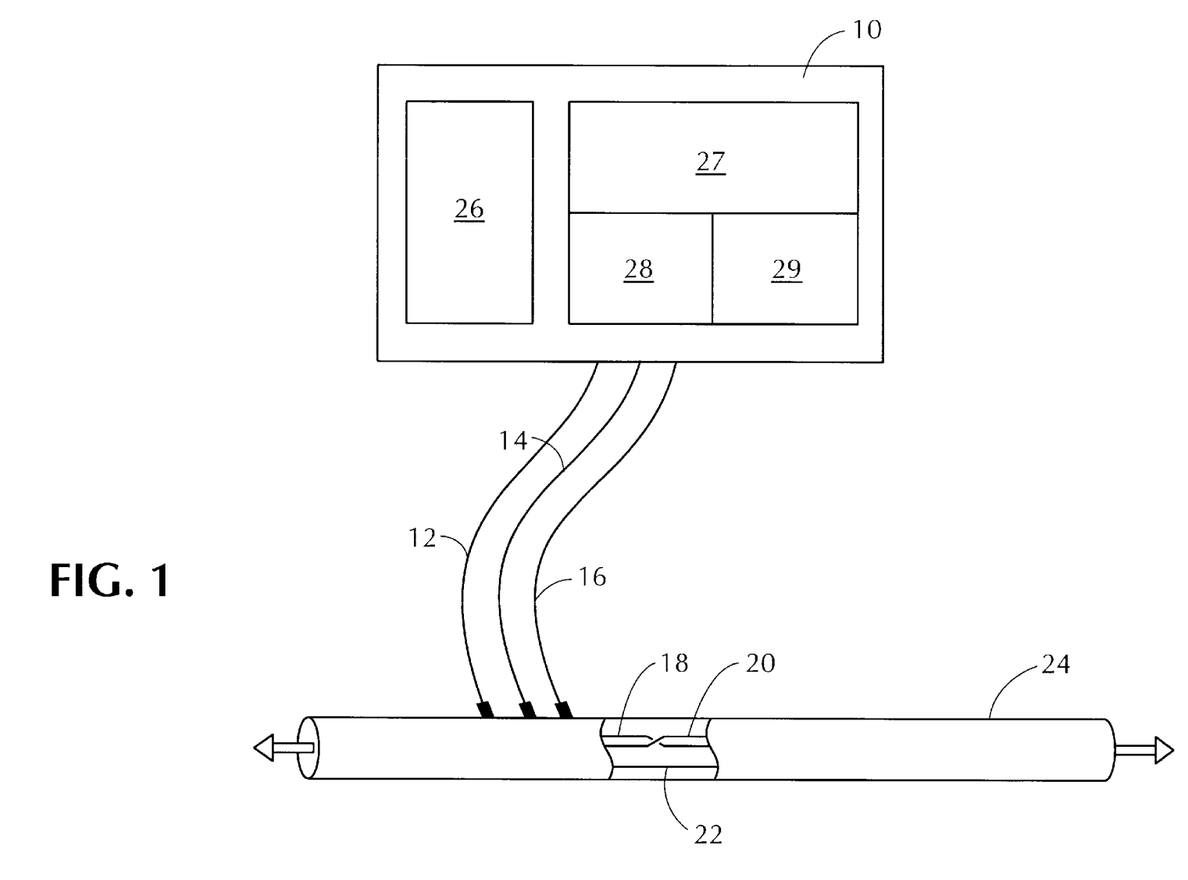
FIG. 1 is a pictorial representation of one embodiment of the present invention.

FIG. 1 shows a pictorial representation of a longitudinal balance testing unit developed in accordance with the present invention. The longitudinal balance testing unit 10 utilizes three test leads 12, 14 and 16 to physically connect to the tip 18, ring 20 and ground 22 wires in a telephone line 24. Testing unit 10 includes a processing unit 26 such as a computer that is able to process and analyze the test results. Testing unit 10 also includes testing circuit 27 which administers the test signals on the telephone line 24 and reads the resulting signals on the telephone line 24.

Testing circuit 27 includes a signal generating circuit 28 and a signal receiving circuit 29. The signal generating circuit 28 creates a stable and consistent signal at set frequencies to be placed on the telephone line 24. The signal generating circuit 28 should be capable of supplying signals at frequencies from 1 Hz to 10 MHZ. The signal receiving circuit 29 monitors the signals on the telephone line and accurately measures the signal at the different frequency levels. The signal receiving circuit 29 should be able to read and measure signals at high frequency ranges and be able to sample and measure the line without affecting the signals on the line or the measurement of these signals.

Figure 2:
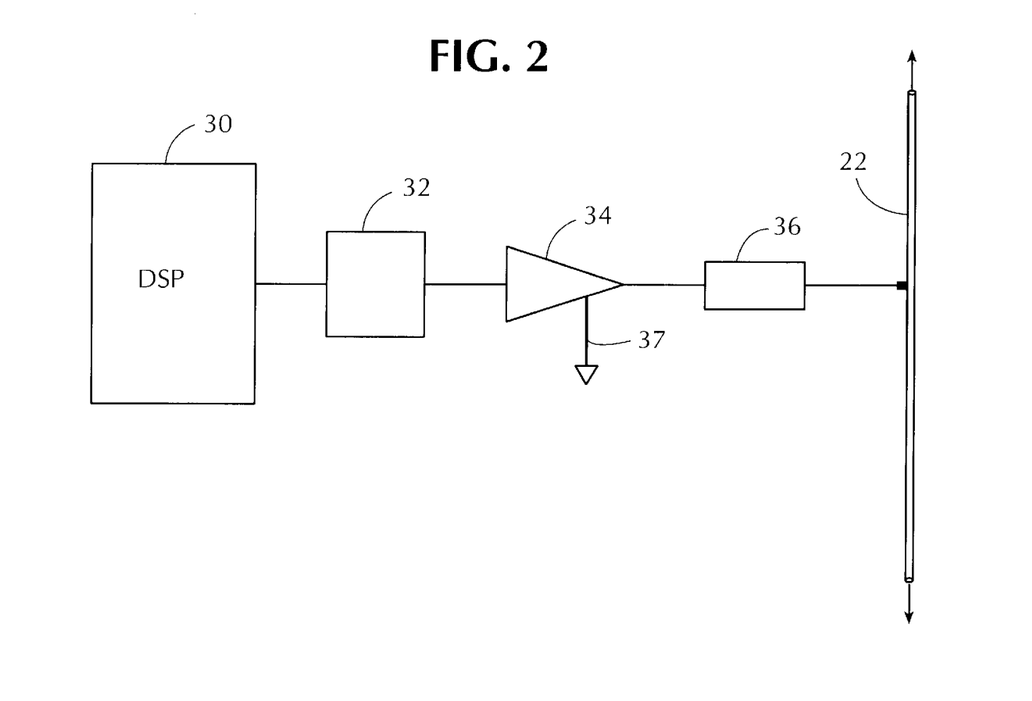
FIG. 2 is a schematic illustrating one embodiment of the signal generating circuit developed in accordance with the present invention.

FIG. 2 depicts one embodiment of the signal generating circuit of test circuit 27. The circuit 27 includes a Digital Signal Processor ("DSP") 30 which is connected to digital-to-analog converter ("D/A converter") 32. DSP 30 generates waveforms and sets the different frequency levels of the test signal. DSP 30 can generate many different signals, e.g. pulses, simulated digital signals and simultaneous sine waves, to accommodate any special requirements. D/A converter 32 takes the generated waveforms and converts the digital signal into an analog sine wave at the desired frequency. The amplifier 34, D/A 32 and DSP 30 are all referenced to an internal circuit ground 37 which is different from the ground 22 in the telephone wire. The DSP 30, in combination with the D/A converter 32, is ideal for the generation of the desired waveforms because of the precision requirements of the test. Being digital, the signals generated by the DSP 30 are precise and completely controllable. In addition, the DSP's processing speed enables it to operate at very high frequencies. Such precision and speed were completely lacking in conventional analog systems.

The output from D/A converter 32 is connected to amplifier 34 to increase the gain of the signal. The amplifier 34 is used to ensure that the signal carries throughout the line to perform an effective testing on the lines.

The output from amplifier 34 is connected to impedance load 36, which is then connected to the reference ground wire 22 in the telephone line 24. Impedance load 36 can vary in value and is not critical to the operation of the invention. This embodiment utilizes a 1 k ohm resistance.

In operation, DSP 30 generates digital signals to emulate waveforms at specified frequencies. D/A converter 32 converts the signal into an analog signal which gets amplified and placed on the ground reference 22 wire. By placing the signal on the ground wire 22, it effectively places a signal on the tip 18 and ring 20 wires of the telephone line 24 since the ground wire 22 is used as a reference point by both tip 18 and ring 20 wires. By utilizing only one signal, it also ensures that the test signal is the same for both the tip 18 and ring 20 wires. In this implementation, there is no possibility that the signal generating circuit 28 is also creating an imbalance by having slight deviations between the test signal placed on the tip and ring wires. It is the same signal for the both wires.

Figure 3:
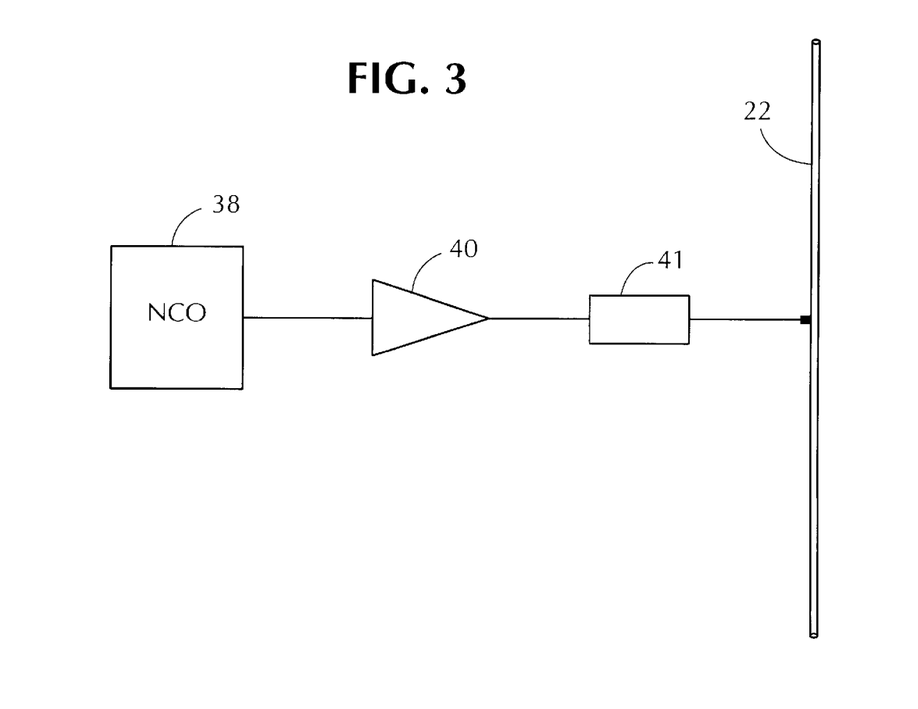
FIG. 3 is a schematic illustrating another embodiment of the signal generating circuit development in accordance with the present invention.

FIG. 3 depicts another embodiment of the signal generating circuit 28 of test circuit 27. In this embodiment, the signal generator is implemented by using a numerically controlled oscillator 38 in combination with an amplifier 40 and impedance load 41. The numerically controlled oscillator 38 can digitally generate analog sine and cosine wave forms at a programmable periodic rate. The numerically controlled oscillator 38 can also handle the high speed and precision required and the sine and cosine outputs can be adjusted over a wide range of frequencies with a high degree of resolution. The signal from the numerically controlled oscillator 38 and amplifier 40 are connected to the ground wire 22 through load resistor 41. The tip 18 and ring 20 wires are monitored for any differences between the signal on each wire by the signal receiving circuit 29.

Figure 4:
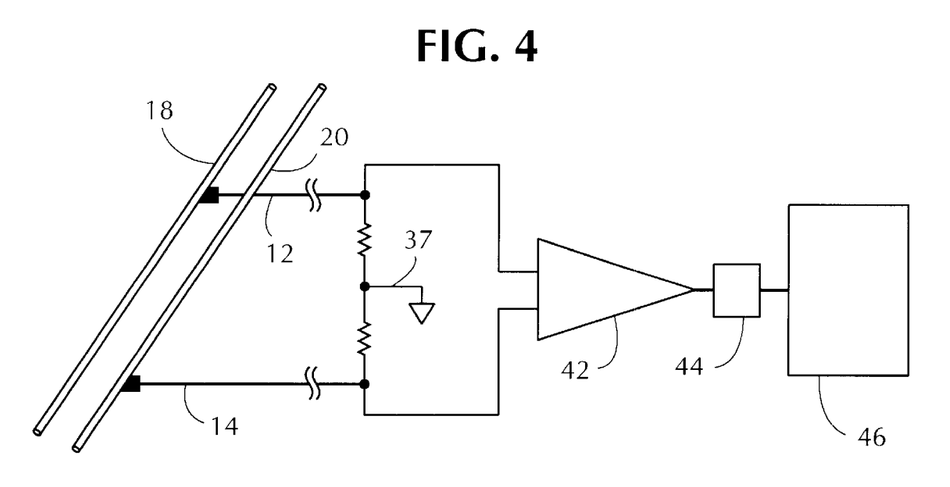
FIG. 4 is a schematic illustrating one embodiment of the signal receiving circuit developed in accordance with the present invention.

FIG. 4 depicts one embodiment of the signal receiving circuit 29 contained within the testing circuit 27. The receiving circuit 29 utilizes two lead wires 12,14 to be connected directly to the tip 18 and ring 20 wires of the telephone line 24. These wires must be balanced themselves to prevent skewing the signal on each line and/or affecting the measurement. Both lead wires are connected to a differential amplifier 42 or high balance amplifier. The differential amplifier 42 essentially compares the two signals and outputs an amplified signal representing the difference between the signals on the tip 18 and ring 20 wires referencing the internal circuit ground 37. The amplified signal is then input into a D/A converter 44 which is then connected to a DSP 46. The DSP 46 used in the signal generating circuit 28 can be the same component as contained in the signal receiving circuit.

Figure 5:
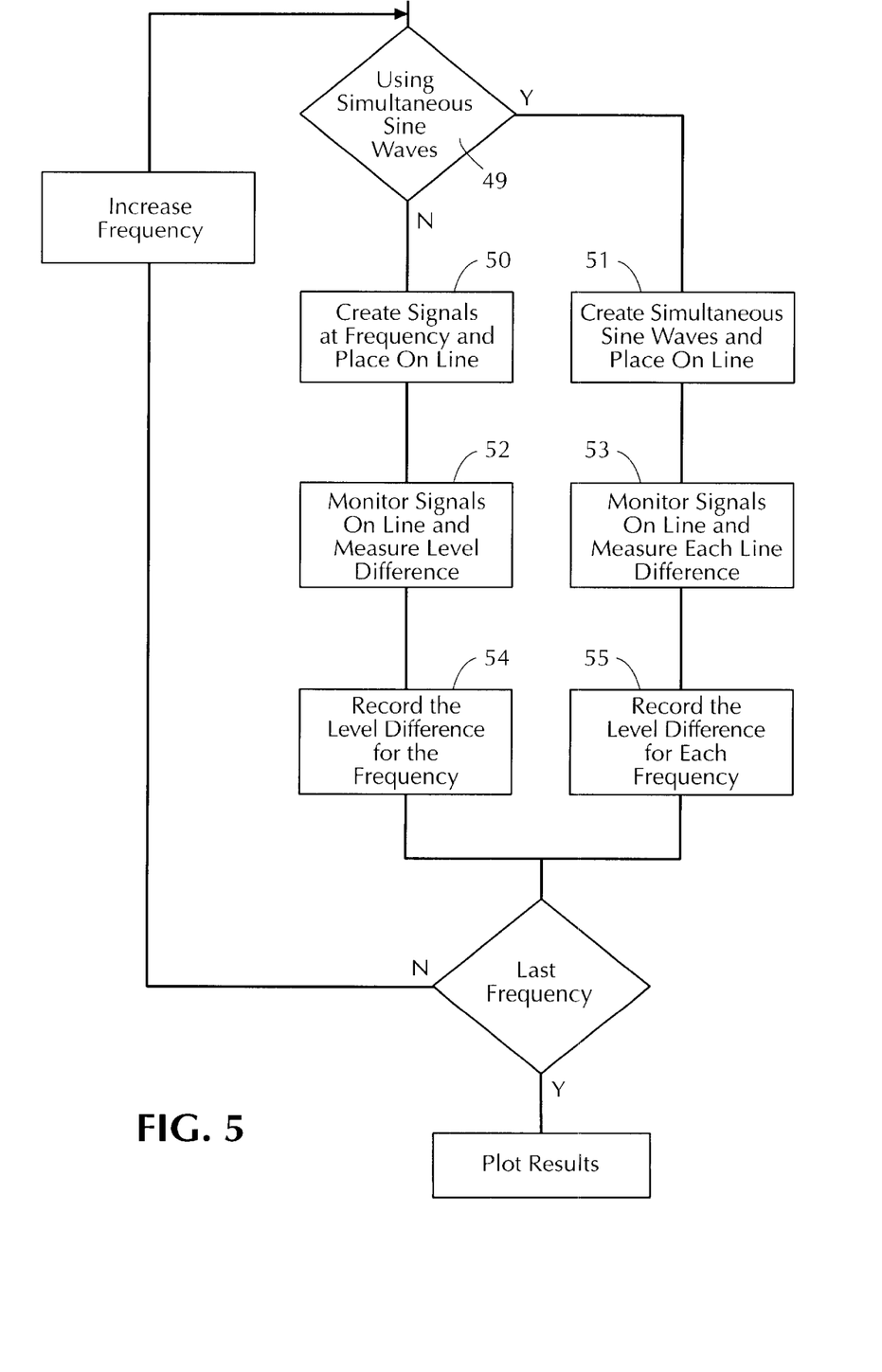
FIG. 5 is a flow chart that shows one embodiment of the present invention.

The operation of one embodiment of the invention can be seen by referring to the flow chart contained in FIG. 5. First, the user must determine whether he will be using a single frequency signal or a simultaneous sine wave. Using the simultaneous sine wave allows the test to determine the balance for different frequencies with the test results are obtained much quicker, but the power requirement to generate this signal is increased.

For example, using a single frequency signal and increasing the frequency in gradual steps can take seconds to complete the test while a multi-tone signal or a simultaneous sine wave signal can be performed in approximately 1/100 of the time. In contrast, the single tone signal can uses ¼ the power of the multi-tone signal.

If the user decides not to use a simultaneous sine wave signal, then the signal generator begins the test by creating and placing a signal on the line at a beginning frequency such as 1 kHz as seen in signal generating step 50. The line is monitored as indicated by monitoring step 52 and the signals on both the tip 18 and ring 20 are measured and compared. The result is then recorded in recording step 54.

If the user decides to use a simultaneous sine wire signal then the signal generator creates the multi-tone signal and places it on the line as demonstrated in signal generating step 51. The signals on the lines are monitored and the level difference is measured and recorded for each frequency. The multi-tone signal does not have to encompass the whole range of desired test frequencies.

In either case of using a single tone or a multi-tone signal, if the last test frequency has not been used, the signal generator circuit then increases the frequency of the test signal by an incremental amount. The test can use a 3.4 kHz incremental step, which corresponds to ADSL mod points, but any incremental amount should be sufficient.

Figure 6:
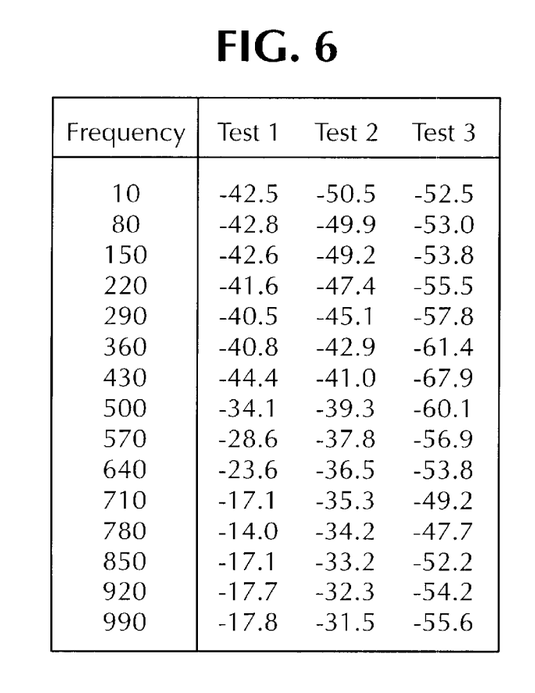
FIG. 6 is a chart that contains the results of three imbalance tests performed in accordance with the present invention.

After the desired range of frequencies have been covered, it is possible to plot the results of the test to determine the imbalance of the telephone line 24. FIG. 6 depicts a chart showing the results of three separate tests in accordance with the present invention. As we can see, each test starts off at frequency 10 kHz and increases in frequency by 70 kHz steps. An imbalanced measurement is taken at each frequency level. Although these three tests utilize 70 kHz increases, span a range of approximately 990 kHz and do not reach frequencies above 1 megahertz, the test can utilize any incremental amount, span a range as little as 10kHz and reach frequencies higher than 1 megahertz.

Previously, by testing at only 1 kHz, disturbances at different frequencies would be detected if the frequency range of the disturbance was relatively close to the 1 kHz frequency. Such disturbances, however, might only partially affect the imbalance measurement which could be interpreted as not evidencing an imbalance. By taking the imbalance measurements for each frequency tested, it becomes clear what frequencies are susceptible to being disturbed and no interpretation becomes necessary.

Figure 7:
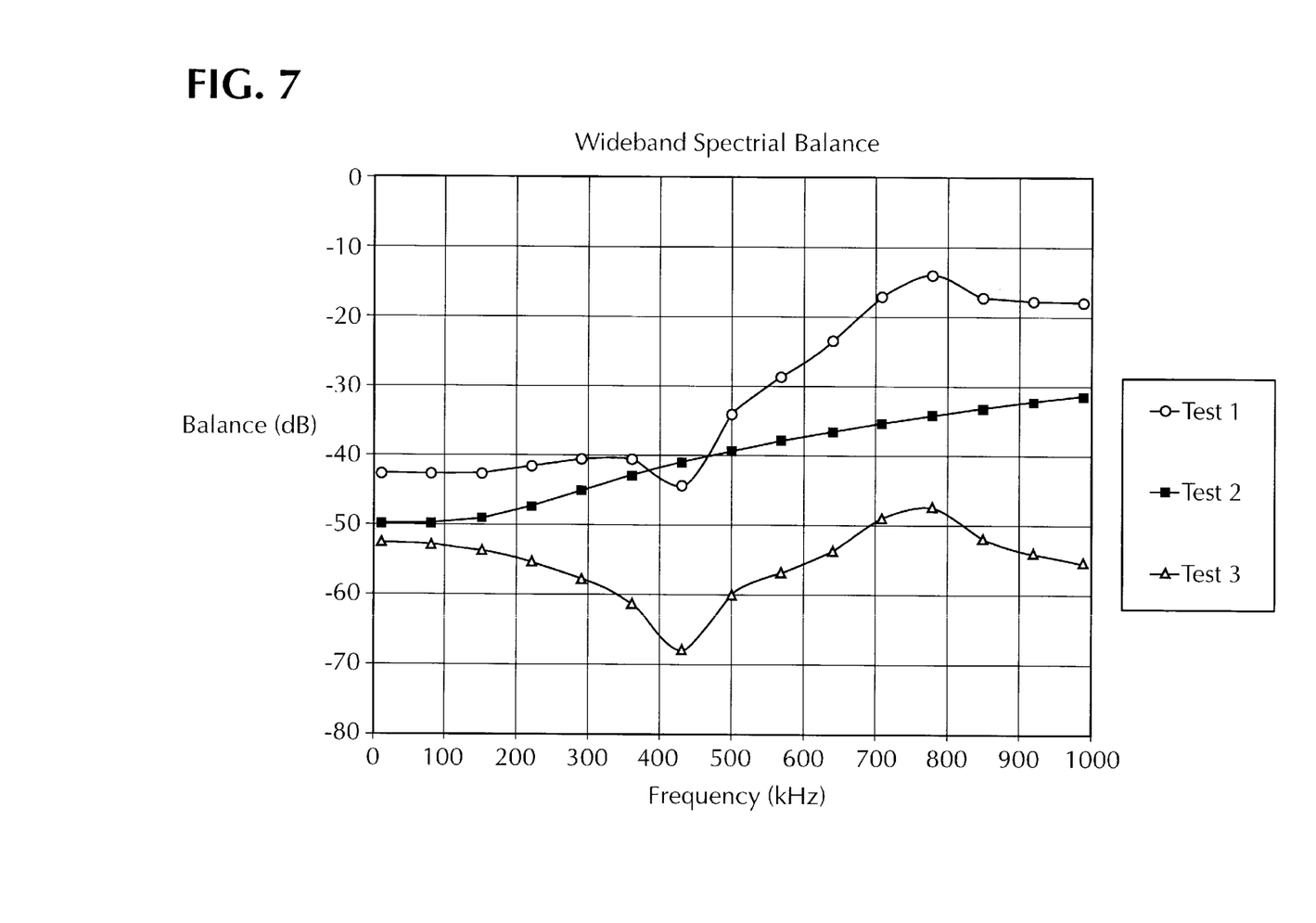
FIG. 7 is a graph that depicts the results of the three imbalance tests performed in accordance with the present invention.

FIG. 7 depicts a graphical plot of the results from FIG. 6. Each frequency level that the test signal was generated at constitutes a plot data point on the x axis. The y axis denotes the measurement of the balance. By plotting a graph of the test, it enables the test to have an overall picture of the balance characteristics of the telephone line and allow for the tester to determine where the telephone line is vulnerable to imbalance disturbances. For example, the line tested in Test 1 indicates that it has bad balance at the near end at the upper frequencies but has good balance at the audio band. The results from Test 2 indicate that the line is relatively evenly balanced throughout the portion of line that was tested. The plot of the third test indicates that the line has good balance at the near end and good at the audio band but has a bad balance at the far end of the line. With the results of the graphical plot, the tester does not have to rely upon an empirical standard determining the range of operating parameters. With a Wide Band Spectral Balance Analysis, the tester now can determine the areas in which a telephone line is susceptible to disturbances and at what frequencies. The slope of the line can determine if the balance is bad while the actual value or balance may be good at a particular frequency.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims. References to tip, ring and ground, wherein ground is an actual wire which runs with the tip and ring wires is equally applicable to a non-shielded wire which uses earth as its reference ground point.

We claim:

1. A method for testing a telephone line for longitudinal balance, comprising the steps of:

setting an initial frequency level;

generating a signal at said frequency level;

causing said generated signal to be placed on first and second wires in a telephone line;

monitoring signals on said first and second wires;

measuring any differences between signals on said first wire and signals on said second wire;

recording each measurement of differences for said frequency;

increasing the frequency level by a predetermined amount;

repeating said generating, causing, monitoring, measuring, recording and increasing steps until said frequency level reaches a predetermined final frequency level; and comparing the recorded difference measurements to determine whether said first and second wires are balanced.

2. A method as claimed in claim 1, further comprising the step of displaying the difference measurements against the frequency in graphical form.

3. A method as claimed in claim 1, wherein said predetermined final frequency level is greater than said initial frequency level by 1 kilohertz.

4. A method as claimed in claim 1, wherein said predetermined final frequency level is greater than said initial frequency level by 10 kHz.

5. A method as claimed in claim 1, wherein said predetermined final frequency level is greater than said initial frequency level by 100 kHz.

6. A method as claimed in claim 1, wherein said predetermined final frequency level is greater than said initial frequency level by 1 MHz.

7. A method as claimed in claim 1, wherein said predetermined final frequency level is greater than 10 kHz.

8. A method as claimed in claim 1, wherein said predetermined final frequency level is greater than 100 kHz.

9. A method as claimed in claim 1, wherein said predetermined final frequency level is greater than 1 mHz.

10. A method for testing a telephone line for longitudinal balance, comprising the following steps:

setting a frequency range to be tested;

generating a test signal; said signal including a plurality of frequencies;

causing said generated signal to be placed on first and second wires in a telephone line;

monitoring signals on said first and second wires;

measuring any differences between signals on said first wire and signals on said second wire;

recording each measurement of difference for each said frequency that was included in said signal;

changing the frequencies that are included in said signal;

repeating said generating, causing, monitoring, measuring, recording and changing steps until each frequency in said frequency range has been included in said test signal and comparing the recorded difference measurements to determine whether the first wire and second wire are balanced.

11. A method for testing a telephone line for longitudinal balance, comprising the steps of:

setting an initial frequency level;

generating a signal at said frequency level;

causing said generated signal to be placed on a first and second wires in a telephone line;

monitoring signals on said first and second wires;

measuring any differences between signals on said first wire and signals on said second wire;

recording each measurement of differences for said frequency;

increasing the frequency level by a predetermined amount;

repeating said generating, causing, monitoring, measuring, recording and increasing steps until said frequency level reaches a predetermined final frequency level; and displaying the difference measurements in graphical form to enable a determination of whether said first and second wires are balanced based on the shape that the difference measurements display in graphical form.

12. A method as claimed in claim 11, wherein said determination includes calculating locations on the wires where the first and second wires are balanced.

13. A method as claimed in claim 11, wherein said determination includes calculating the frequencies at which the first and second wires are balanced.

14. A method for testing a telephone line for longitudinal balance, comprising the steps of:

for each of a plurality of frequency levels ranging from an initial frequency level to a final frequency level, starting with the initial frequency level, repeating the following steps:

generating a signal at the each frequency level;

placing the generated signal on first and second wires in a telephone line;

monitoring signals on the first and second wires;

measuring any differences between signals on the first wire and signals on the second wire; and recording each measurement of differences for the each frequency level;

until all frequency levels between the initial frequency level and the final frequency level have been tested;

wherein the recorded difference measurements are used to determine whether the first and second wires are balanced.

15. The method according to claim 14 wherein the step of generating a signal at the each frequency level includes generating a multi-tone signal having a plurality of frequencies to increase the test speed.

16. The method according to claim 14 wherein the step of placing the generated signal includes inputting the generated signal on the ground that is common to both the first and second wires of the telephone line.

* * * * *